United States Patent
Yarabolu et al.

(10) Patent No.: US 12,072,961 B2
(45) Date of Patent: Aug. 27, 2024

(54) SYSTEMS AND METHODS FOR PASSWORD SPRAYING IDENTIFICATION AND PREVENTION USING HASH SIGNATURE SEGMENTATION AND BEHAVIOR CLUSTERING ANALYSIS

(71) Applicant: BANK OF AMERICA CORPORATION, Charlotte, NC (US)

(72) Inventors: Vijay Kumar Yarabolu, Telangana (IN); Ravi Prasad Challagulla, Secunderabad (IN); Usha Kiran Maddela, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 227 days.

(21) Appl. No.: 17/876,986

(22) Filed: Jul. 29, 2022

(65) Prior Publication Data
US 2024/0037197 A1 Feb. 1, 2024

(51) Int. Cl.
G06F 21/31 (2013.01)
G06F 21/62 (2013.01)

(52) U.S. Cl.
CPC ........ G06F 21/316 (2013.01); G06F 21/6218 (2013.01)

(58) Field of Classification Search
CPC ................ G06F 21/316; G06F 21/6218
See application file for complete search history.

(56) References Cited

U.S. PATENT DOCUMENTS

| | | | |
|---|---|---|---|
| 6,389,419 B1 | 5/2002 | Wong et al. | |
| 7,278,160 B2 | 10/2007 | Black et al. | |
| 7,509,677 B2 | 3/2009 | Saurabh et al. | |
| 8,204,945 B2 | 6/2012 | Milliken et al. | |
| 9,411,955 B2 | 8/2016 | Jakobsson | |
| 10,003,605 B2 * | 6/2018 | Muddu | H04L 43/045 |
| 10,503,967 B2 | 12/2019 | Sarrafzadeh et al. | |
| 11,005,824 B2 | 5/2021 | Crabtree et al. | |
| 11,277,423 B2 * | 3/2022 | Brown | H04L 63/1416 |

(Continued)

FOREIGN PATENT DOCUMENTS

| | | |
|---|---|---|
| CN | 106161395 | 11/2016 |
| CN | 109635564 | 4/2019 |

(Continued)

*Primary Examiner* — Harunur Rashid
(74) *Attorney, Agent, or Firm* — Moore & Van Allen PLLC; Lauren M. Stokes

(57) ABSTRACT

Systems, computer program products, and methods are described herein for identification and verification of brute force attacks using hash signature segmentation and behavior clustering analysis. The present invention is configured to receive a plurality of access attempts and an associated plurality of hash values; determine a failure request load based on the plurality of access attempts; determine whether the failure request load meets a failure threshold, wherein, in an instance where the failure request load meets the failure threshold, separating the plurality of access attempts associated with the failure request load into a plurality of hash clusters; generate a behavior cluster for each hash cluster based on shared behavior data of the plurality of access attempts; and determine, based on the behavior cluster for each hash cluster, a likelihood of misappropriation for each access attempt of the plurality of access attempts.

17 Claims, 7 Drawing Sheets

(56) References Cited

U.S. PATENT DOCUMENTS

| | | | |
|---|---|---|---|
| 11,418,524 B2* | 8/2022 | Urbanski | ................. G06N 7/01 |
| 2002/0091680 A1 | 7/2002 | Hatzis et al. | |
| 2003/0115485 A1 | 6/2003 | Milliken | |
| 2016/0028758 A1 | 1/2016 | Ellis et al. | |
| 2018/0248896 A1 | 8/2018 | Challita et al. | |
| 2018/0288026 A1* | 10/2018 | Callaghan | ............. H04L 9/3226 |
| 2020/0304524 A1* | 9/2020 | Weinberger | ......... H04L 63/1425 |
| 2021/0099295 A1* | 4/2021 | Li | ........................ H04L 9/3226 |

FOREIGN PATENT DOCUMENTS

| | | |
|---|---|---|
| CN | 109862029 | 6/2019 |
| CN | 109981647 | 7/2019 |
| CN | 110417747 | 11/2019 |

\* cited by examiner

SYSTEMS AND METHODS FOR PASSWORD SPRAYING IDENTIFICATION AND PREVENTION USING HASH SIGNATURE SEGMENTATION AND BEHAVIOR CLUSTERING ANALYSIS

FIELD OF THE INVENTION

The present invention embraces a system and method for password spraying identification and prevention using hash signature segmentation and behavior clustering analysis.

BACKGROUND

Applications, online services, and users of such applications and online services have a harder time than ever before keeping their authentication credentials and account details secure. This is especially true when brute force attacks employed by misappropriating entities can, in short periods of time, transmit an abundance of potential authentication credentials to different login user interfaces of the applications and online services in an attempt to gain access to different user accounts in a short time period. Such brute force attacks may be referred to herein has password spraying attacks, which are implemented by misappropriating entities who wish to test the same password for a multitude of accounts at the exact same time until the password is accepted and the misappropriator can gain access to at least one account. Current systems and security enforcements have a difficult time identifying such brute force attacks and preventing these brute force attacks from gaining access until after account information has already been misappropriated. Thus, there exists a need to track these accounts as authentication credentials are entered and transmitted for access, determine which access attempts are potential brute force attacks, and use such information regarding the access attempts of the future brute force attacks to gauge future access attempts that may use similar methods.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for identifying and preventing password spraying using hash signature segmentation and behavior clustering analysis, the system comprising: a memory device with computer-readable program code stored thereon; at least one processing device operatively coupled to the at least one memory device and at least one communication device, wherein executing the computer-readable code is configured to cause the at least one processing device to: receive a plurality of access attempts and an associated plurality of hash values; determine a failure request load based on the plurality of access attempts; determine whether the failure request load meets a failure threshold, wherein, in an instance where the failure request load meets the failure threshold, separating the plurality of access attempts associated with the failure request load into a plurality of hash clusters, each hash cluster of the plurality of hash clusters being based on a shared hash value of the plurality of access attempts; generate a behavior cluster for each hash cluster based on shared behavior data of the plurality of access attempts; and determine, based on the behavior cluster for each hash cluster, a likelihood of misappropriation for each access attempt of the plurality of access attempts.

In some embodiments, and in the instance where the plurality of access attempts are separated into the plurality of hash clusters, separating the plurality of hash clusters by a specified time period, such that each hash cluster of the plurality of hash clusters comprise the plurality of access attempts associated with the specified time period.

In some embodiments, the computer-readable code is further configured to cause the at least one processing device to store the behavior cluster in a behavior database, wherein the behavior database comprises a plurality of behavior clusters associated with the plurality of access attempts without the associated plurality of hash values. In some embodiments, the plurality of behavior clusters are used to determine the likelihood of misappropriation for each access attempt of the plurality of access attempts.

In some embodiments, the computer-readable code is further configured to cause the at least one processing device to store the associated plurality of hash values in a hash value database, wherein the hash value database comprises the associated plurality of hash values and an associated indication of a likelihood of misappropriation. In some embodiments, the associated plurality of hash values stored in the hash value database are compared to a plurality of future hash values associated with a plurality of future access attempts and wherein, in an instance where a hash value of the hash value database matches a future hash value of the plurality of future access attempts, access is automatically denied to an account associated with the access attempt.

In some embodiments, the computer-readable code is further configured to cause the at least one processing device to: receive future access attempt data associated with a future access attempt, the future access attempt data comprising future behavior data and a future hash value; and determine a behavior similarity score based on a comparison of the future behavior data and the behavior cluster, wherein, in an instance where the behavior similarity score meets a behavior similarity threshold, access is automatically denied to an account associated with the access attempt, or wherein, in an instance where the behavior similarity score fails to meet the behavior similarity threshold, store the future access attempt as a non-misappropriation.

In some embodiments, a behavior cluster comprises a plurality of behavior clusters for the hash cluster. In some embodiments, the plurality of behavior clusters comprises at least one duplication data, interaction speed data, typing pattern data, error rate data, access attempt vicinity data, mouse dynamic data, event sequence data, authentication credential data, browser data, operating system data, device data, payload data, access attempt timestamp duplication data, access attempt timestamp pattern data, or source IP data.

In another aspect, a computer-program product for identifying and preventing password spraying using hash signature segmentation and behavior clustering analysis is provided. The computer-program product may comprise at least one non-transitory computer-readable medium having computer-readable program code portions embodied therein, the computer-readable program code portions which when executed by a processing device are configured to cause the processor to: receive a plurality of access attempts and an associated plurality of hash values; determine a failure request load based on the plurality of access attempts; determine whether the failure request load meets a failure threshold, wherein, in an instance where the failure request load meets the failure threshold, separating the plurality of access attempts into a plurality of hash clusters, each hash cluster of the plurality of hash clusters being based on a shared hash value of the plurality of access attempts; generate a behavior cluster for each hash cluster based on shared behavior data of the plurality of access attempts; and determine, based on the behavior cluster for each hash cluster, a likelihood of misappropriation for each access attempt of the plurality of access attempts.

In some embodiments, and in an instance where the plurality of access attempts are separated into the plurality of hash clusters, separating the plurality of hash clusters by a specified time period, such that the plurality of hash clusters comprise the plurality of access attempts associated with the specified time period.

In some embodiments, the computer-readable program code portions which when executed by a processing device further configures the processor to store the behavior cluster in a behavior database, wherein the behavior database comprises a plurality of behavior clusters associated with the plurality of access attempts without the associated plurality of hash values. In some embodiments, the plurality of behavior clusters are used to determine the likelihood of misappropriation for each access attempt of the plurality of access attempts separate from the associated plurality of hash values.

In some embodiments, the computer-readable program code portions which when executed by the processing device further configures the processor to store the associated plurality of hash values in a hash value database, wherein the hash value database comprises the associated plurality of hash values and an associated indication of a likelihood of misappropriation. In some embodiments, the associated plurality of hash values stored in the hash value database are compared to a plurality of future hash values associated with a plurality of future access attempts and wherein, in an instance where a hash value of the hash value database matches a future hash value of the plurality of future hash values, access is automatically denied to an account associated with the access attempt.

In some embodiments, the computer-readable program code portions which when executed by a processing device is further configured to cause the processor to: receive future access attempt data associated with a future access attempt, the future access attempt data comprising future behavior data and a future hash value; and determine a behavior similarity score based on a comparison of the future behavior data and the behavior cluster, wherein, in an instance where the behavior similarity score meets a behavior similarity threshold, access is automatically denied to an account associated with the access attempt, or wherein, in an instance where the behavior similarity score fails to meet the behavior similarity threshold, store the future access attempt as a non-misappropriation.

In some embodiments, a behavior cluster comprises a plurality of behavior clusters for the hash cluster. In some embodiments, the plurality of behavior clusters comprises at least one of duplication data, interaction speed data, typing pattern data, error rate data, access attempt vicinity data, mouse dynamic data, event sequence data, authentication credential data, browser data, operating system data, device data, payload data, access attempt timestamp duplication data, access attempt timestamp pattern data, or source IP data.

In another aspect, a computer-implemented method for identifying and preventing password spraying using hash signature segmentation and behavior clustering analysis is provided. The computer-implemented method may comprise receiving a plurality of access attempts and an associated plurality of hash values; determining a failure request load based on the plurality of access attempts; determining whether the failure request load meets a failure threshold, wherein, in an instance where the failure request load meets the failure threshold, separating the plurality of access attempts into a plurality of hash clusters, each hash cluster of the plurality of hash clusters being based on a shared hash value of the plurality of access attempts; generating a behavior cluster for each hash cluster based on shared behavior data of the plurality of access attempts; and determining, based on the behavior cluster for each hash cluster, a likelihood of misappropriation for each access attempt of the plurality of access attempts.

In some embodiments, the computer-implemented method further comprises: receiving future access attempt data associated with a future access attempt, the future access attempt data comprising future behavior data and a future hash value; and determining a behavior similarity score based on a comparison of the future behavior data and the behavior cluster, wherein, in an instance where the behavior similarity score meets a behavior similarity threshold, access is automatically denied to an account associated with the access attempt, or wherein, in an instance where the behavior similarity score fails to meet the behavior similarity threshold, store the future access attempt as a non-misappropriation.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
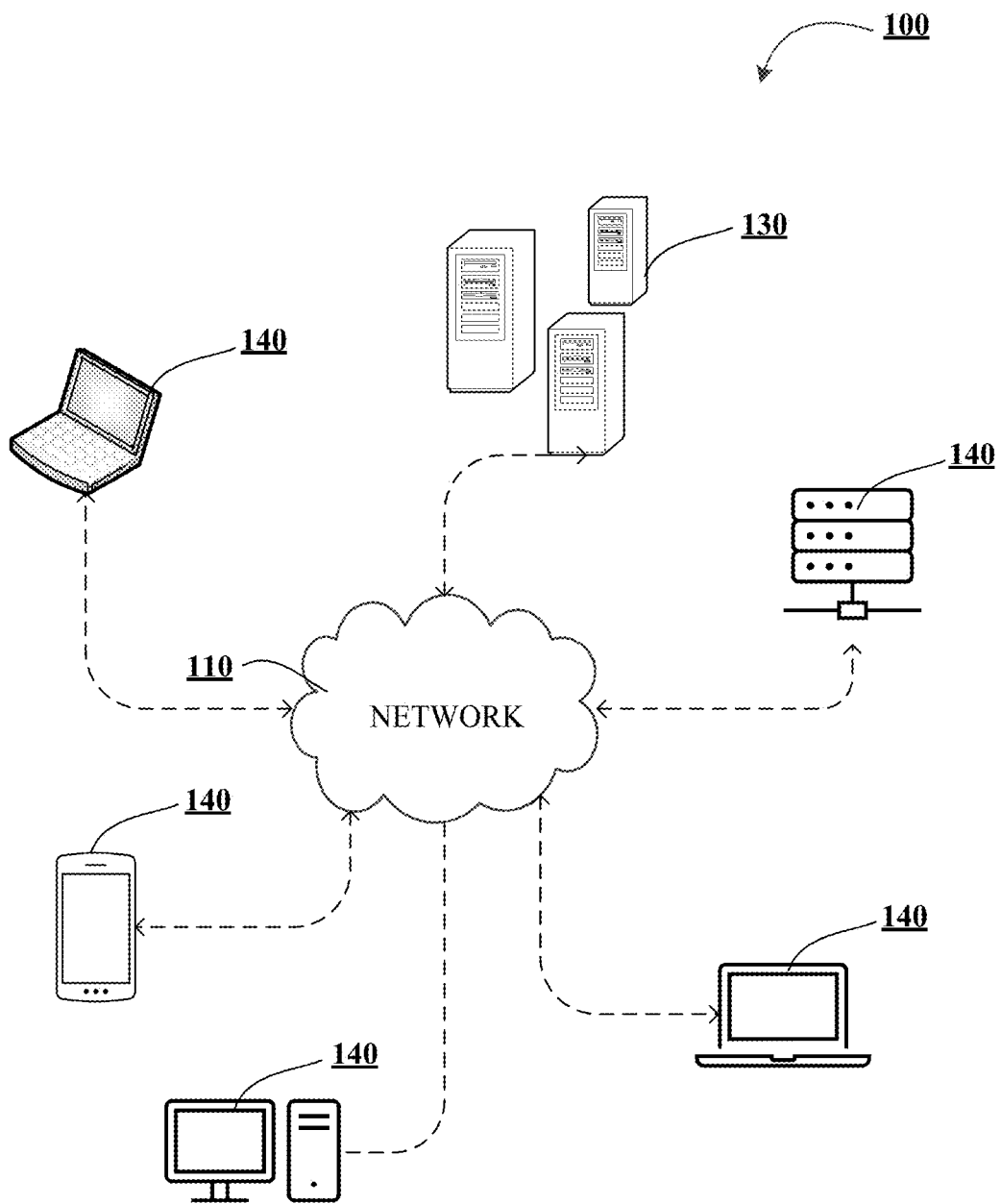
Figure 1B:
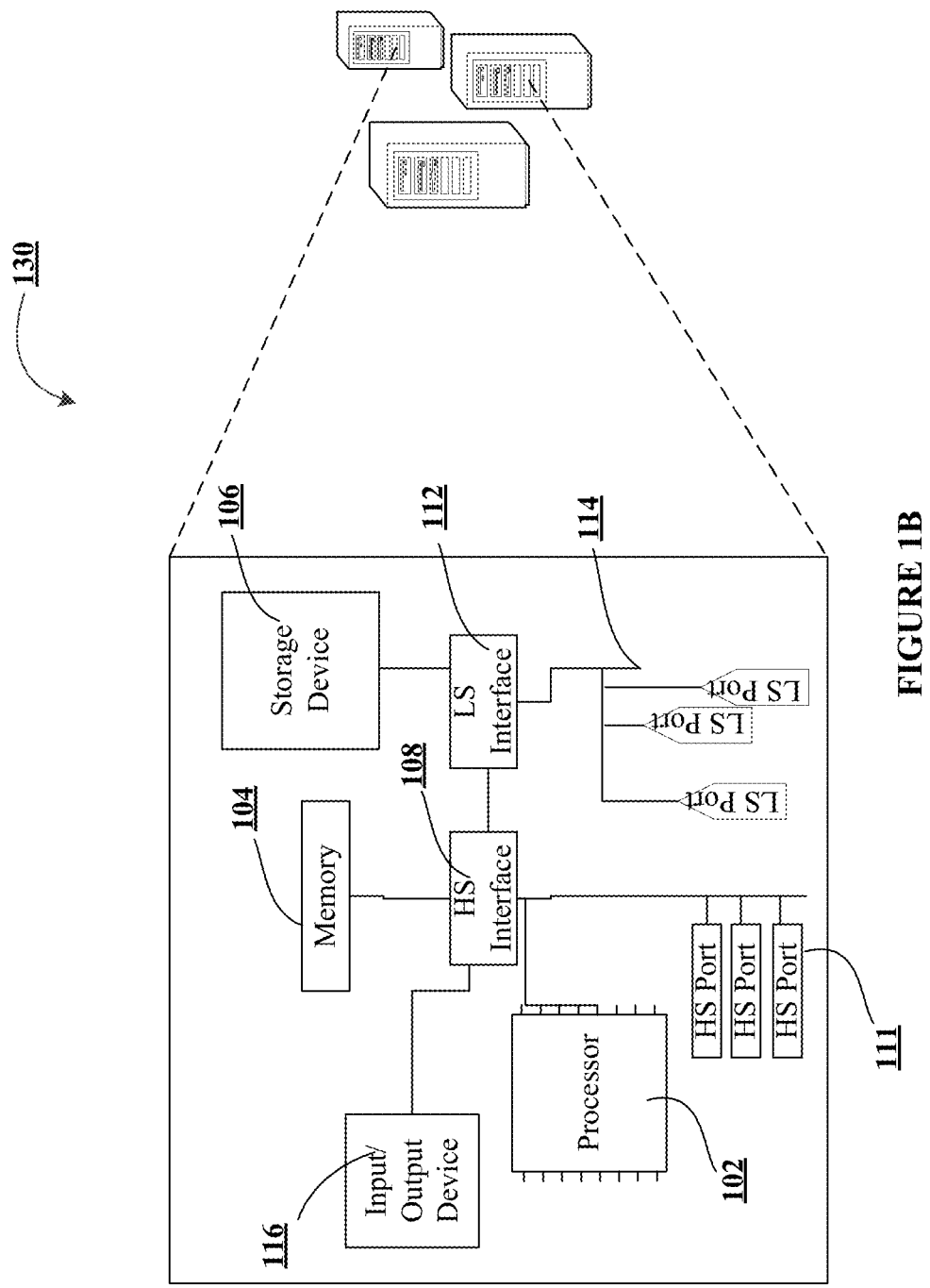
Figure 1C:
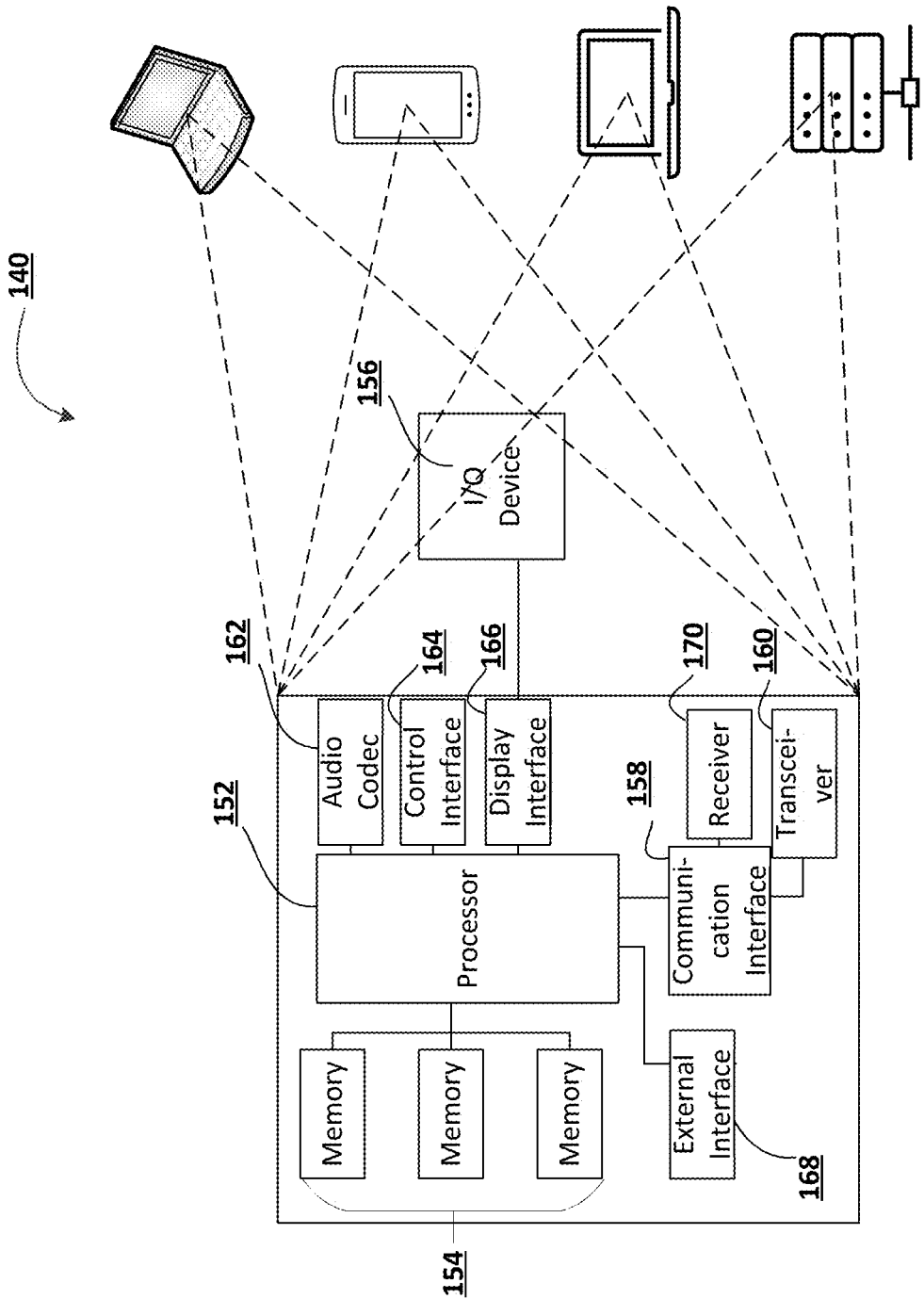
Figure 2:
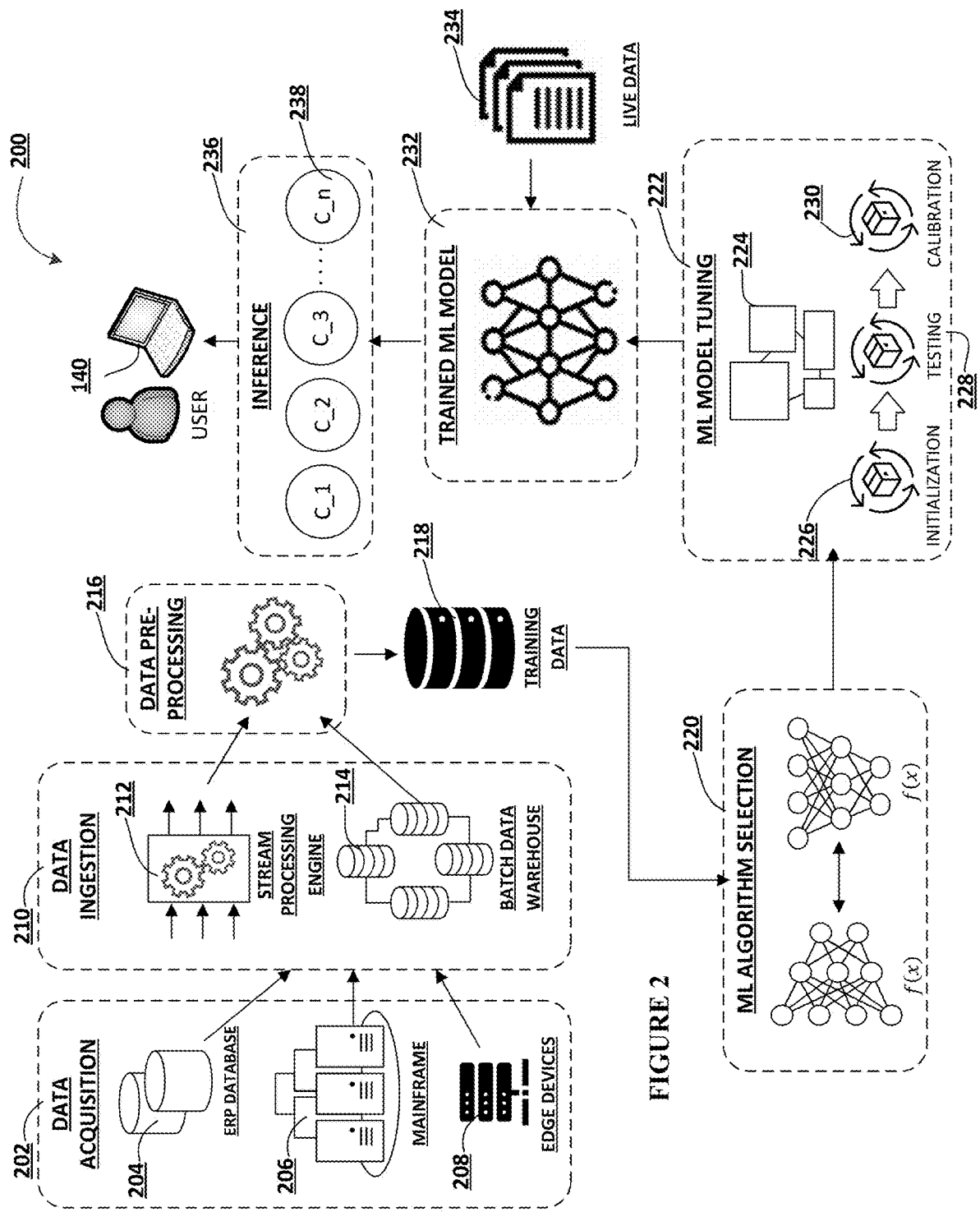
Figure 3:
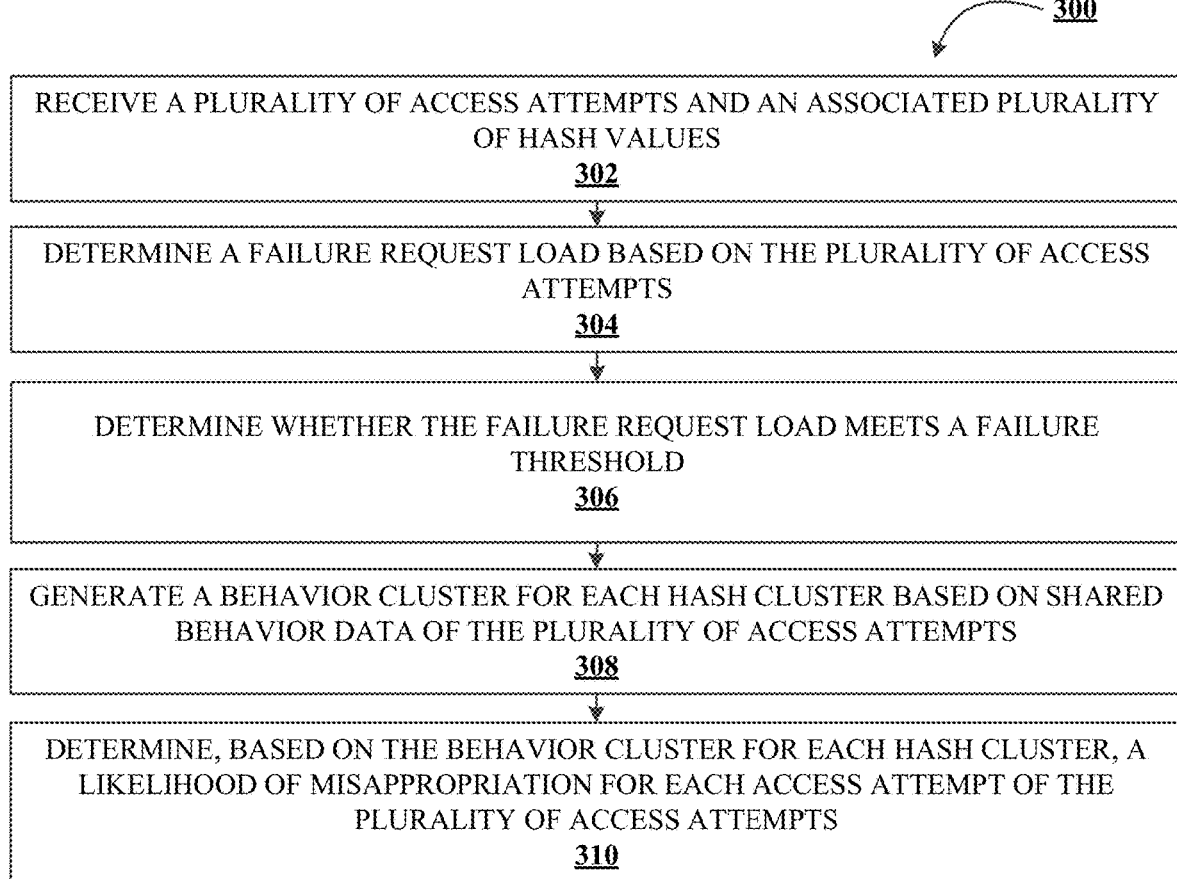
Figure 4:
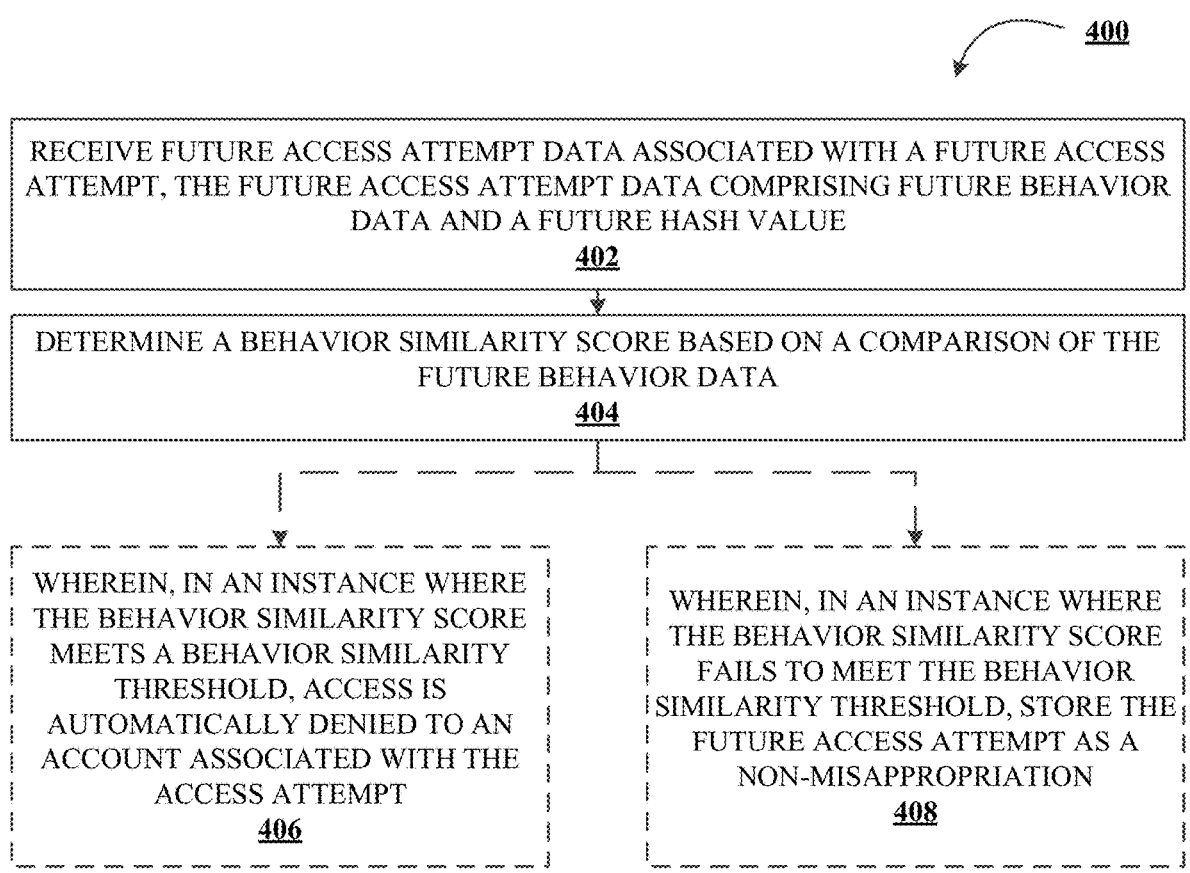
Figure 5:
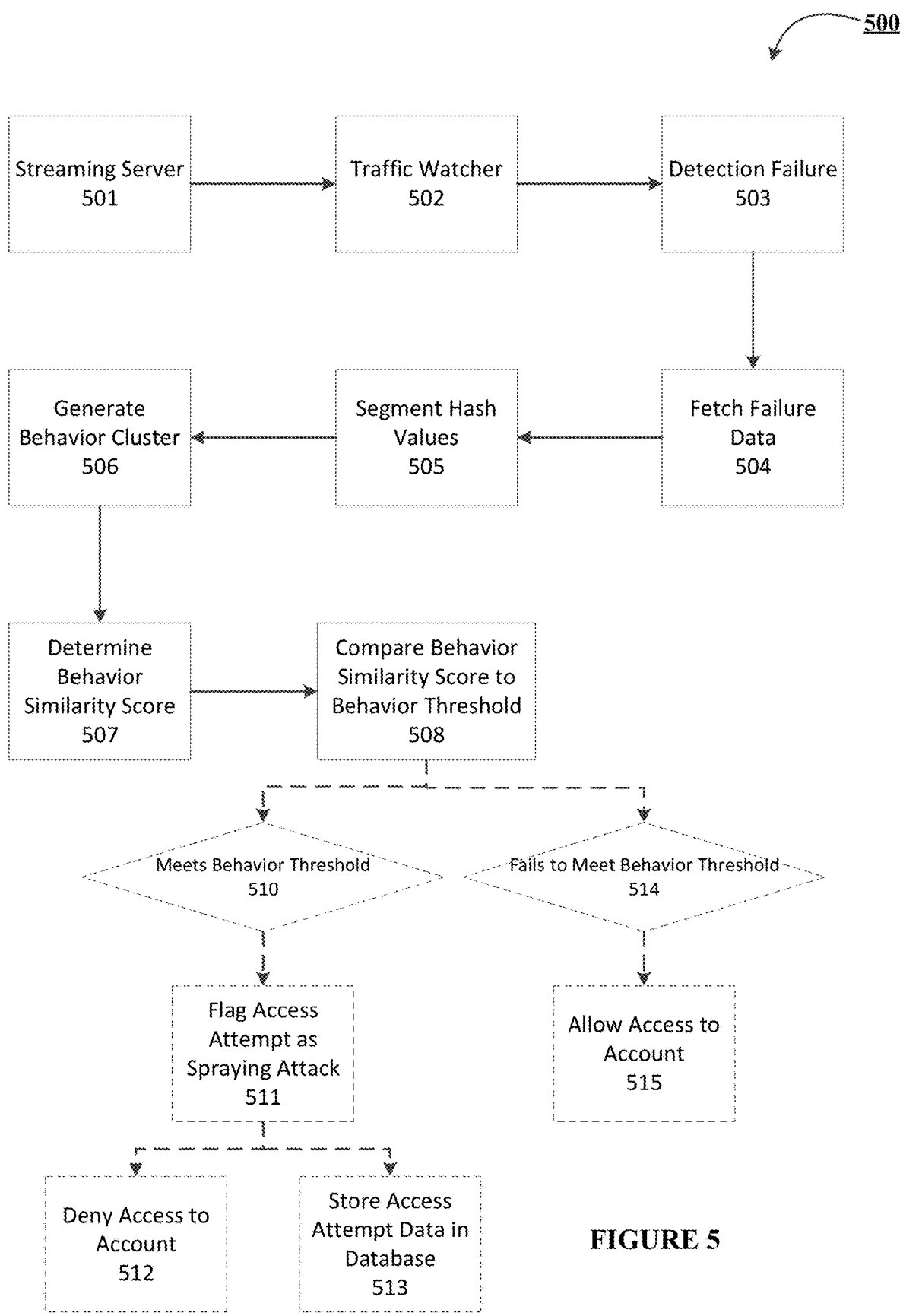

Having thus described embodiments of the invention in general terms, reference will now be made the accompanying drawings, wherein:

FIGS. 1A-1C illustrates technical components of an exemplary distributed computing environment for systems and methods for password spraying identification and prevention using hash signature segmentation and behavior clustering analysis, in accordance with an embodiment of the invention;

FIG. 2 illustrates technical components of an exemplary machine learning model (or "AI engine") for systems and methods for password spraying identification and prevention using hash signatures and behavior clustering analysis, in accordance with an embodiment of the invention;

FIG. 3 illustrates a process flow for identifying and preventing password spraying using hash signature segmentation and behavior clustering analysis, in accordance with an embodiment of the invention;

FIG. 4 illustrates a process flow for determining whether access to an account associated with the access attempt should be denied or allowed, in accordance with an embodiment of the invention; and FIG. 5 illustrates an exemplary flowchart of an exemplary flow to determine whether a password spraying attack has occurred and to deny or allow access to an account based on this determination, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, the "account identifier" may generally refer to may generally refer to one or more data elements by which an account associated with a client/entity and/or brute force identification system may be uniquely identified. The account identifier may include, without limitation, a username, a name, an email address, a phone number, a bank account number, a social security number, and/or the like. The account identifier may include, for example, one or more of Internet Protocol (IP) addresses associated with the user's device, numerical characters, alphabetical characters, alphanumeric codes, American Standard Code for Information Interchange (ASCII) characters, identification certificates, the like, or combinations thereof.

As used herein, the "correct account identifier" may generally refer to one or more data elements by which an account associated with a client/entity and/or brute force identification system may be uniquely identified. The correct account identifier may include, without limitation, a username, a name, an email address, a phone number, a bank account number, a social security number, and/or the like. The correct account identifier may include, for example, one or more of Internet Protocol (IP) addresses associated with the user's device, numerical characters, alphabetical characters, alphanumeric codes, American Standard Code for Information Interchange (ASCII) characters, identification certificates, the like, or combinations thereof.

As used herein, the "incorrect account identifier" may generally refer to one or more data elements by which the client/entity and/or brute force identification system may uniquely identify as not being part of its system (e.g., an account identifier that is not recognized by the identification and verification system or the client/entity such that it is shown that the account does not exist). The incorrect account identifier may include, without limitation, a username, a name, an email address, a phone number, a bank account number, a social security number, and/or the like. The incorrect account identifier may include, for example, one or more of Internet Protocol (IP) addresses associated with the user's device, numerical characters, alphabetical characters, alphanumeric codes, American Standard Code for Information Interchange (ASCII) characters, identification certificates, the like, or combinations thereof.

As used herein, the "flag identifier" may generally refer to one or more data elements by which the client/entity and/or brute force identification system may uniquely identify an access attempt as being a part of a misappropriation. The flag identifier may include, for example, one or more of Internet Protocol (IP) addresses associated with the user's device, numerical characters, alphabetical characters, alphanumeric codes, American Standard Code for Information Interchange (ASCII) characters, identification certificates, the like, or combinations thereof.

As described in further detail herein, the present invention provides a solution to the above-referenced problems in the field of technology by generating an accurate and efficient identification process to identify whether an access attempt using authentication credentials is part of a brute force attack, such as a password spraying attack. The present invention solves this technical problem by implementing a brute force identification system, like that shown as system 130 in FIGS. 1A-1C. For instance, the brute force identification system generates a hash value for each access attempt, uses the generated hash values to generate hash clusters and within each hash cluster generates a behavior cluster comprising behavior data of each access attempt. In this manner, the brute force identification system may use a machine learning model/AI engine, like that shown as system 200 of FIG. 2. The machine learning model/AI engine may be trained to analyze the hash value and the behavior data within each behavior cluster to determine behavior pattern(s) and determine whether each access attempt has a likelihood of misappropriation (i.e., is part of a password spraying attack). In this manner, the brute force identification system acts to quickly and efficiently analyze large portions of data, in real-time as authentication credentials are entered, and their associated behavior data to determine whether the access attempts should be trusted as non-misappropriation rather than as a brute force attack. Such other prior systems have failed to accurately, efficiently, and on a large-scale determine such brute force attacks.

Accordingly, the brute force identification system works by receiving a plurality of access attempts and an associated plurality of hash values; determining a failure request load based on the plurality of access attempts; determining whether the failure request load meets a failure threshold, wherein, in an instance where the failure request load meets the failure threshold, separating the plurality of access attempts associated with the failure request load into a plurality of hash clusters, each hash cluster of the plurality of hash clusters being based on a shared hash value of the plurality of access attempts; generating a behavior cluster for each hash cluster based on shared behavior data of the plurality of access attempts; and determining, based on the behavior cluster for each hash cluster, a likelihood of misappropriation for each access attempt of the plurality of access attempts.

What is more, the present invention provides a technical solution to a technical problem. As described herein, the technical problem includes the identification and denial of brute force attacks within a computing system, where the brute force attacks may comprise the input of the same password for a large multitude of accounts in the hopes that the password will be correct for at least one account. The technical problem is even more exacerbated by the amount of access attempts that are transmitted at one time for each account that the brute force attack is using to conduct its attack. The technical solution presented herein allows for the use of a hashing process to generate a hash value, a machine learning model/AI engine to analyze behavior data associated with the generated hash value for each of the plurality of access attempts and to generate a behavior similarity score, and the comparison of the behavior similarity score to a behavior threshold to determine whether a misappropriation has likely occurred (i.e., a brute force attack has occurred). In particular, the brute force identification system is an improvement over existing solutions to the identification of brute force attacks, (i) with fewer steps to achieve the solution, thus reducing the amount of computing resources, such as processing resources, storage resources, network resources, and/or the like, that are being used (e.g., by analyzing each access attempt and its behavior data in a centralized environment—such as by clustering the access attempts by hash value and then within each hash cluster a plurality of behavior clusters— allows for a streamlined approach to analyze the access attempts comprising the same password against each other rather than on individual bases); (ii) providing a more accurate solution to problem, thus reducing the number of resources required to remedy any errors made due to a less accurate solution, where less accurate solutions may lead to errors in predicting brute force attacks and unnecessary denial of access to accounts associated with the access attempts; (iii) removing manual input and waste from the implementation of the solution, thus improving speed and efficiency of the process and conserving computing resources; (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for systems and methods for password spraying identification and prevention using hash signature segmentation and behavior clustering analysis 100, in accordance with an embodiment of the invention. As shown in FIG. 1A, the distributed computing environment 100 contemplated herein may include a system 130 (i.e., a brute force identification system), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture—which is also referred to herein as an AI engine—200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for determining a likelihood of misappropriation for each access attempt of the plurality of access attempts, in accordance with an embodiment of the invention. In some embodiments, a system (e.g., similar to one or more of the systems described herein with respect to FIGS. 1A-1C) may perform one or more of the steps of process flow 300. For example, a brute force identification system (e.g., the system 130 described herein with respect to FIGS. 1A-1C and the machine learning model/AI engine of FIG. 2) may perform the steps of process flow 300.

As shown in block 302, the process flow 300 may include the step of receiving a plurality of access attempts and an associated plurality of hash values. By way of non-limiting example, the access attempts herein described may refer to the attempts to access accounts by inputting authentication credentials into a user interface component associated with an entity and/or client of the brute force identification system. In some embodiments, these access attempts may be correct for at least one account and/or incorrect for at least one account (e.g., one of the attempts to access a plurality of accounts may use the correct account identifier and passcode and/or one of the access attempts may use the incorrect account identifier and/or the incorrect passcode). In some embodiments, the plurality of access attempts may comprise a password spraying attack such that one password is input as an authentication credential for a plurality of account identifiers in an attempt to misappropriate an account and its data.

In some embodiments, and for each access attempt, the brute force identification system may collect a password for each access attempt and an associated hash value may be generated based on the password. By way of non-limiting example, once a password has been collected by the brute force identification system, the password of the authentication credentials may be used to generate a hash value, where a single hash value may be associated with a plurality of account identifiers for each account identifier that had the same password entered as an authentication credential. In this manner, the hash value may match for a plurality of account identifiers and may be used to indicate a password spraying attack. Such a hash value may be generated by using a key known by the brute force identification system and the password.

In some embodiments, the plurality of access attempts may occur at the same time (e.g., exact same time) or near the same time (e.g., within a few milliseconds of another access attempt, within a few seconds of another access attempt, within a minute of another access attempt, and/or the like). By way of non-limiting example, the brute force identification system may collect and/or receive the plurality of access attempts within a specified time period that may be determined by the brute force identification system, by a client of the brute force identification system, and/or by a manager of the brute force identification system.

In some embodiments, the brute force identification system may receive the plurality of access attempts via a network (e.g., network 110 of FIG. 1A) from a single user device associated with at least one IP address. In some embodiments, the user device may be used to input the authentication credentials for a plurality of accounts (e.g., such as a password spraying attack which is used to input a plurality of the same password as an authentication credentials for a plurality of different accounts/account identifiers).

In some other embodiments, the brute force identification system may receive the plurality of access attempts via a network (e.g., network 110 of FIG. 1A) from a plurality of user devices, wherein the authentication credentials may be the same for the plurality of access attempts and within the same period of time (e.g., at the same time and/or near the same time as described above).

As shown in block 304, the process flow 300 may include the step of determining a failure request load based on the plurality of access attempts. In some embodiments, the failure request load may refer to the amount of failed access attempts captured by the brute force identification system within the specified time period. The specified time period may vary (e.g., within a few seconds, within a minute, within 5 minutes, withing 10 minutes, within 15 minutes, within 30 minutes, within an hour, and/or within a day). Such failed access attempts may also refer to the access attempts which comprised the wrong password for each account identifier. In some embodiments, the failure request load may comprise the data regarding each access attempt that failed (e.g., including at least one hash value of the access attempt and/or behavioral data, which is described more fully herein).

As shown in block 306, the process flow 300 may include the step of determining whether the failure request load meets a failure threshold. By way of non-limiting example, the failure request load may be measured against a failure threshold, where the failure request load may comprise a number of failed access attempts within the specified time period and the failure threshold may comprise a number of failed access attempts that are unacceptable within the specified time period and may indicate that a password spraying attack has occurred. For instance, if a password spraying attack has occurred, the amount of failed access attempts may be abundant compared to a normal amount of failed access attempts within the specified time period (e.g., two, three, four, or five times the amount of failed access attempts that would be normal for non-password spraying attack attempts, where each user associated with an account would be inserting their own authentication credentials).

In some embodiments, the failure threshold may be pre-determined by the manager of the brute force identification system, a client of the brute force identification system (e.g., such as a particular entity or institution, like a financial institution employing the brute force identification system to track access attempts and potential misappropriation of authentication credentials). By way of non-limiting example, failure threshold may include an 2x amount of failed access attempts in the specified time period, where x may refer to an expected amount of failed access attempts in a non-password spraying environment for a specified time period (e.g., where each user associated with their account are inputting the authentication credentials and are generating failed access attempts). In some embodiments, the specified time period may comprise any one of a few seconds, a minute, five minutes, ten minutes, fifteen minutes, and/or the like. Such a failure threshold may be updated periodically by the brute force identification system.

In some embodiments, where in an instance where the failure request load meets the failure threshold, the brute force identification system may separate the plurality of access attempts associated with the failure request load into a plurality of hash clusters, where each hash cluster of the plurality of hash clusters is based on a shared hash value from the plurality of access attempts. In other words, and in some embodiments, each hash cluster may comprise a single hash value, the associated access attempt data, and the behavior data for each access attempt, where the single hash value was generated from the same password input for each access attempt of the plurality of access attempts for the hash cluster.

In some embodiments, this separation of the plurality of access attempts associated with the failure request load may occur automatically by a processing device, like that shown in FIG. 1B. In some embodiments, this separation of the plurality of access attempts associated with the failure request load may occur by a machine learning model/AI system.

In some embodiments, the separation of the plurality of hash clusters may be further based on the specified time period, such that each hash cluster of the plurality of hash clusters comprises the plurality of access attempts associated with the specified time period. Such specified time period may be pre-determined by the brute force identification system, a client of the system, and/or a manager of the brute force identification system where the access attempts are input at the same time and/or in a similar time.

As shown in block 308, the process flow 300 may include the step of generating a behavior cluster for each hash cluster based on shared behavior data of the plurality of access attempts. In some embodiments, the generation of the behavior cluster for each hash cluster may refer to the generation of a behavior pattern of the behavior data for each hash cluster. By way of non-limiting example, the behavior pattern for each hash cluster may be based on the behavior data collected for each hash value and the associated access attempt data.

In some embodiments, each behavior cluster for each hash cluster may comprise the behavior data for the entire hash cluster, including any behavior data collected for each access attempt of the hash cluster. The behavior cluster may be generated based on a shared behavior pattern of the plurality of access attempts, such as the behavior data comprising at least one of duplication data, interaction speed data, typing pattern data, error rate data, access attempt vicinity data, mouse dynamic data, event sequence data, authentication credential data, browser data, operating system data, device data, payload data, access attempt timestamp duplication data, access attempt timestamp pattern data, or source IP data.

In some embodiments, each pattern of the behavior data listed and described below may be identified and determined by a machine learning model/AI engine like that described with respect to FIG. 2. Based on this identification and/or determination, the brute force identification system may generate the behavior clusters for each behavior data such that each behavior cluster comprises the pattern for each behavior data.

In some embodiments, the duplication data may comprise the password data used for each access attempt of the plurality of access attempts. By way of non-limiting example, such duplication data may indicate that the same password has been entered an authentication credential multiple times for different accounts and/or the same account. Such duplication data may track how many instances the same password was entered into the system within the specified time period. In some embodiments, the duplication data may track how many instances the same password was entered into the system in an overall time period (i.e., an overall amount from the start of tracking such data until the end of tracking such data by the brute force identification system).

In some embodiments, the interaction speed data may comprise the overall time in which the access attempt is input (e.g., the authentication credentials are input) and transmitted to the brute force identification system and/or the client. By way of non-limiting example, the interaction speed data may refer to the time taken to submit a form comprising the authentication credentials and transmit the request to access the account based on the authentication credentials. A pattern may arise where the time taken to submit the form and transmit the request is the same across a plurality of access attempts.

In some embodiments, the typing pattern data may comprise the typing speed in inputting the authentication credentials, which may further include the time gap between key input (i.e., key pressing) for the authentication credentials. By way of non-limiting example, a pattern of typing pattern data may arise where the time gap between key presses is the same, when the keys pressed are the same or when the keys are different.

In some embodiments, the error rate data may comprise the rate of making mistakes when typing in the authentication credentials and/or mis-clicking components on the user interface component such as the "submit" component for submitting the request to access the account. By way of non-limiting example, the error rate data may indicate that the entity inputting the authentication credentials makes the same mistake(s) each time they input the authentication credentials (e.g., either the username/account identifier and/or the password) and/or when the entity tries to submit the request (i.e., tries to submit the form comprising the authentication credentials for access to the account). In some embodiments, a pattern may arise where the entity submitting the access attempt makes the same mis-clicks and/or mis-types for a plurality of access attempts within the specified time period. In some embodiments, a pattern may arise where the entity submitting the access attempts makes the same mis-clicks and/or mis-types for a plurality of access attempts in an overall time period (i.e., the overall amount from the start of tracking such data until the end of tracking such data by the brute force identification system).

The access attempt vicinity data may comprise data regarding IP geolocation of each access attempt, where each access attempt may be tracked along with the data of the IP geolocation at each time the request to access the account is submitted (e.g., authentication credentials are submitted). By way of non-limiting example, the access attempt vicinity data may indicate a pattern where a plurality of access attempts are generated and transmitted from the same IP geolocation and/or from the same general IP geolocation (e.g., within 1 mile of each other, within 2 miles from each other, within 3 miles from each other, within 4, miles of each other, within 5 miles from each other, within the same zip code, within the same city/town, within the same county, within the same state, and/or the like).

The mouse dynamic data may comprise data regarding mouse click data and patterns, where the mouse click data may comprise information on where exactly the mouse click is occurring for specific user interface component buttons (e.g., where in the "submit" button are the mouse clicks occurring, such as in other user interface component buttons, such as a "back" button, a "forward" button, a "delete" button, and/or the like). By way of non-limiting example, if an entity submitting a request to access an account continues to click in a specific coordinate of a user interface component button, such as the "submit" button, then a pattern may arise. In some embodiments, such a pattern may arise from what appears to be multiple entities submitting a plurality of access attempts, but which all comprise the same mouse click coordinates.

The event sequence data may comprise data regarding event sequences, such as an event sequence of buttons pressed, user interface component buttons selected, and/or the like. For instance, if the same event sequence of clicking tab, tab, type, click, and/or the like occurs for a plurality of access attempts, then a pattern may arise for a plurality of access attempts. In some embodiments, this may be true for an event sequence comprising user interface component buttons such as the event sequence of pressing "submit," "back," "submit," and "exit" when the user interface component comprises a graphical user interface showing that the authentication credentials were not accepted (e.g., the wrong password was submitted and access was denied).

The authentication credential data may comprise the account identifiers used for the plurality of access attempts, such as the account identifier and/or usernames of each access attempt (e.g., User1, User12, User 123, User1234, and/or the like). By way of non-limiting example, such authentication credential data may indicate that a plurality of account identifiers are being used for a plurality of access attempts occurring at the same time and/or in a similar time period, which may indicate a brute force attack such as a password spraying attack. Such authentication credential data may track how many account identifiers are submitted as part of a plurality of access attempts in order to determine if a large amount of access attempts for a large amount of account identifiers has occurred in a shortened time period (e.g., a specified time period) as compared to a non-password spraying attack (e.g., as compared to users themselves submitting access attempts for their own accounts).

The browser data may comprise data regarding the types of browsers used in the plurality of access attempts, where a pattern may arise where most if not all of the access attempts occurring within the specified time period are occurring from the same browser. By way of non-limiting example, if a browser such as Google Chrome™, Internet Explorer®, and/or the like is used for a plurality of access attempts in a specified time period, then a pattern may be recognized by the brute force identification system.

The operating system data may comprise data regarding the operating system of the device used to transmit the access attempt (e.g., the user device used to generate the access attempt), such as data regarding a device type identifier (e.g., Android®, iPhone®, iPad®, Mac® computer, Dell® desktop, and/or the like), a hardware specifications identifier configuring each device type (e.g., memory storage, software version, model number, battery type, operating system, screen size, and/or the like), and/or a device identifier (e.g., IMEI, serial number, and/or the like). In some embodiments, a pattern may be determined by the brute force identification system if a plurality of access attempts are occurring and are all being transmitted from the same device (e.g., such as an Android® Build v8.12.4 device), within a specified period of time.

The device data may comprise data regarding the battery of the device used to generate and transmit the access attempt. By way of non-limiting example, such device data may comprise the current battery life of the device at each access attempt transmission, such as the current battery level (e.g., 99% of battery life left, 50% of battery life left, 25% of battery life left, and/or the like). In some embodiments, a pattern may be determined where a plurality of access attempts occur in the specified time period and the plurality of access attempts occur from a device that has the same (i.e., exact same) and/or similar (e.g., within a 1% tolerance) battery life. Such a similarity (e.g., the exact same and/or similar) of battery life for a plurality of access attempts may indicate that the plurality of access attempts are being generated and transmitted from the same device.

The payload data may comprise data regarding the MDA (Model-Driven Architecture) payload data of the device, such as by tracking whether a plurality of access attempts comprise the same MDA payload. A pattern may be identified and/or determined where a plurality of access attempts occurring within the specified time period comprise the same MDA payload.

The access attempt timestamp duplication data may comprise data regarding duplication for timestamps of access attempts, such as a duplication of access attempts at the same timestamp (e.g., a plurality of access attempts all occur at the same timestamp such that a duplication of timestamps occur for the plurality of access attempts). A pattern may be identified and/or determined when a plurality of access attempts has the same exact timestamp and/or a very similar timestamp (e.g., within a tolerance of a few milliseconds and/or a tolerance of a few seconds).

The access attempt timestamp pattern data may comprise data regarding gaps in timestamps between access attempts, where the gaps may be used to identify and/or determine a pattern for when access attempts are generated and/or transmitted. By way of non-limiting example, a pattern may be identified and/or determined when a gap between timestamps for each access attempt of the plurality of access attempts is the same (e.g., a gap is exactly ten seconds between access attempts comprising the same password and/or different passwords).

The source IP data may comprise data regarding the IP address for each access attempt of the plurality of access attempts. In some embodiments, once an IP address has been collected from an access attempt, the IP address may be compared to IP addresses stored in the brute force identification system's database (e.g., the hash value database, the behavior database, and/or the general database) and if the IP address collected from the access attempt matches an IP address stored in the brute force identification system's database, then it may be determined that the access attempt is likely a misappropriation, such as a password spraying attack. In some embodiments, if the IP address collected from the access attempt does not match an IP address stored in the system's database, then the brute force identification system may rely on other behavior data to determine wither there is a likelihood of misappropriation. However, in this manner, the IP address collected from the access attempt may still be stored in the brute force identification system's database for future comparison of access attempts and their associated IP addresses.

In some embodiments, the behavior cluster for each hash cluster may comprise a different variation of one or more of the behavior data types such that each hash cluster comprises a plurality of behavior clusters (e.g., one behavior cluster for each behavior data type), which may be dependent on what patterns of behavior data is collected for each hash cluster.

As mentioned above, the separation of the behavior data and generation of behavior data clusters based on pattern recognition may be done by a machine learning model/AI engine, such as that shown in FIG. 2. For instance, such a machine learning model may be trained based on previously collected behavior data (e.g., duplication data, interaction speed data, typing pattern data, error rate data, access attempt vicinity data, mouse dynamic data, event sequence data, authentication credential data, browser data, operating system data, device data, payload data, access attempt timestamp duplication data, access attempt timestamp pattern data, or source IP data) and the patterns associated within each type of behavior data. In some embodiments, the machine learning model/AI engine may be continuously trained as new access attempts are received and new hash clusters are generated.

As shown in block 310, the process flow 300 may include the step of determining a likelihood of misappropriation for each access attempt of the plurality of access attempts. In some embodiments, the likelihood of misappropriation may be based on a machine learning model/AI engine deriving a behavior similarity score based on the patterns of each behavior. For instance, if each behavior data for a plurality of access attempts within the specified time period has behavior patterns (e.g., a pattern of inputting the same password, a pattern of the time taken to generate authentication credentials and transmit an access attempt, a time gap pattern between key presses, a pattern of mis-types or mis-clicks, a pattern of access attempts from a specific IP geolocation, a pattern of mouse-clicking in interface component buttons, a pattern of event sequences, a pattern of account identifiers being used, a pattern of browsers used for access attempts, a pattern of operating systems used for access attempts, a pattern of battery life associated with the devices for access attempts, a pattern of MDA payload data, a pattern of timestamps for the plurality of access attempts, a pattern of gaps between timestamps for the plurality of access attempts, and/or a pattern of IP addresses used in the plurality of access attempts). In some embodiments, if at least one of the above-identified behavior data comprises a pattern, then the brute force identification system may determine that the plurality of access attempts are likely a misappropriation and access may automatically be denied.

In some embodiments, the brute force identification system may determine how many patterns of the behavior data must be present and/or what specific behavior data must comprise a pattern in order to return an output that the plurality of access attempts are likely a misappropriation (i.e., a password spraying attack). In some embodiments, each type of behavior data (as listed out above) may be separated into behavior clusters to be associated with a hash cluster and once the behavior data has been separated, the machine learning model/AI engine may identify and/or determine the behavior patterns for each behavior cluster. Such identification and determination of the behavior patterns may occur in the same manner as described above.

In some embodiments, once the behavior patterns are determined for each behavior cluster, a behavior similarity score may be generated. If the behavior similarity score meets or surpasses a behavior similarity threshold, then the brute force identification system may determine that there is a likelihood of misappropriation. This embodiment is described more fully below with respect to FIG. 4.

In some embodiments, the determination of a likelihood of misappropriation may be based solely on the hash value of the access attempt. For instance, if a hash value of at least one access attempt matches the hash value of a hash value stored in the brute force identification system's database (e.g., the hash value database and/or the general database), and the stored hash value is associated with an indication of a likely misappropriation, then the brute force identification system may determine that the current access attempt is also a misappropriation.

In some embodiments, if the brute force identification system determines that there is a likelihood of misappropriation (i.e., a password spraying attack has occurred for the plurality of access attempts), then access may automatically be denied to the accounts associated with the access attempts. In some embodiments, and if the brute force identification system determines that there is not a likelihood of misappropriation (i.e., a password spraying attach has not occurred for the access attempt(s)), then access may be allowed to the account(s) associated with the access attempt(s).

FIG. 4 illustrates a process flow 400 for determining whether access to an account associated with the access attempt should be denied or allowed, in accordance with an embodiment of the invention. In some embodiments, a system (e.g., similar to one or more of the systems described herein with respect to FIGS. 1A-1C) may perform one or more of the steps of process flow 400. For example, a brute force identification system (e.g., the system 130 described herein with respect to FIGS. 1A-1C and the machine learning model/AI engine of FIG. 2) may perform the steps of process flow 400.

As shown in block 402, the process flow 400 may include the step of receiving future access attempt data associated with a future access attempt, the future access attempt data comprising future behavior data and a future hash value. By way of non-limiting example, the brute force identification system may receive from a plurality of user devices a plurality of access attempts, including the plurality of authentication credentials for each access attempt (e.g., usernames and passwords) over a network (e.g., such as network 110 of FIG. 1A).

In some embodiments, the brute force identification system and its machine learning model/AI engine may be trained to determine a likelihood of misappropriation based on the identification of a future hash value matching a previously identified hash value that was associated with a likelihood of misappropriation. In some embodiments, the machine learning model/AI engine may make the determination of a likelihood of misappropriation based solely on the future hash value matching a previously identified hash value, which was identified as part of a brute force attack.

In some embodiments, the brute force identification system and its machine learning model/AI engine may be trained to determine a likelihood of misappropriation based on the behavior data and the generated behavior clusters and behavior patterns of the behavior clusters. By way of non-limiting example, the machine learning model/AI engine may make the determination of a likelihood of misappropriation based solely on the behavior data and whether the behavior data matches any previously stored behavior data that was indicated as likely being associated with a misappropriation.

In this manner, the machine learning model/AI engine may be trained to determine misappropriation of a future access attempt based on a future hash value and its match to a previously identified hash value, and/or similar behavior data to previously identified behavior data, such that the brute force identification system can determine the likelihood of a password spraying attack quickly without performing another behavior analysis on the hash value and collected behavior data.

As shown in block 404, the process flow 400 may include the step of determining a behavior similarity score based on a comparison of the future behavior data. In some embodiments, the future behavior data may be separated into a plurality of behavior clusters and analyzed by the machine learning model/AI engine to determine the similarity score. In some embodiments, the brute force identification system may determine a behavior similarity score of the future behavior data against a previously generated behavior cluster. In this manner, the brute force identification system (e.g., by way of the machine learning model/AI engine) may look for patterns within the future behavior data that matches or is similar to the behavior cluster(s) that were previously generated and may have been indicated as a behavior pattern showing a likelihood of misappropriation.

In some embodiments, once the behavior clusters are generated, the behavior clusters are stored in a behavior cluster database (e.g., such as a behavior database and/or a database) along with the associated access attempts.

In some embodiments, the behavior cluster database does not store the associated hash values of the behavior clusters. In this manner, future behavior data collected from future access attempts may be compared to the behavior clusters in this behavior cluster database to determine a likelihood of misappropriation. For instance, if a previously determined password spraying attack had certain behavior data and the behavior data is stored as a behavior cluster within the behavior database, then future access attempts and associated future behavior data may be compared to only the data within the behavior cluster database (e.g., only the behavior clusters and/or behavior clusters and the associated hash values) to determine if the same password spraying entity is behind the future access attempt.

In some embodiments, the plurality of hash values may be stored in a hash value database, such that the hash value database comprises the plurality of hash values and the associated indication of a likelihood of misappropriation. In this manner, and by way of non-limiting example, the future hash values associated with the future access attempts may be compared against the plurality of hash values stored in the hash value database. In some embodiments, and based on this comparison, the brute force identification system may determine if a future access attempt is likely a misappropriation (e.g., the future hash value matches at least one of the hash values previously stored in the hash value database, which may indicate that the hash value is associated with a password spraying attack).

In some embodiments, and as shown in block 406, the process flow 400 may include the step of automatically denying access to an account associated with the access attempt in an instance where the behavior similarity score meets and/or exceeds a behavior similarity threshold. By way of non-limiting example, when the behavior similarity score is based on a comparison of the future behavior data with itself (i.e., if there are patterns within each type of future behavior data) and the behavior similarity score is generated based on the determination of a total similarity score of the future behavior data. In this manner, the future behavior data may be assessed by itself without outside factors, such as previously generated behavior clusters.

In some embodiments, the behavior similarity score for future behavior data may be based on a comparison of the future behavior data against previously generated behavior clusters and their behavior data, such that the behavior similarity score is high when the future behavior data comprises a similar pattern to the previously generated behavior clusters. By way of non-limiting example, the future behavior data may individually be compared against the behavior clusters that were previously generated (e.g., rather than after the future behavior data has been compared against itself), and where the future behavior data matches the behavior pattern of the behavior clusters, a high behavior similarity score may be generated for the overall future behavior data.

In some embodiments, the behavior similarity score may be based on both a comparison of the future behavior data with itself and a comparison of the future behavior data with the previously generated clusters. In this manner, a plurality of behavior clusters for the future behavior data (e.g., once the behavior data has been separated and patterns have been determined within each behavior cluster) may be compared against the previously generated behavior clusters to generate the behavior similarity score. The behavior similarity score, in these embodiments, may be higher where the future behavior data (e.g., future behavior clusters) matches and/or is similar to the previously generated behavior clusters and their patterns.

In some embodiments, and as shown in block 408, the process flow 400 may include the step of storing the future access attempt as a non-misappropriation. By way of non-limiting example, if the behavior cluster of the future behavior data does not meet the behavior similarity threshold, then the future access attempt and its data (i.e., future access attempt data) may be stored in a database of the brute force identification system (e.g., hash value database, behavior database, and/or general database) as a non-misappropriation, such as not being involved in a password spraying attack. By way of non-limiting example, once the future access attempt and its data is stored as not being involved in a password spraying attack, the brute force identification system may use the future access attempt data to determine a likelihood of misappropriation for other future access attempts (e.g., by way of comparison).

FIG. 5 illustrates a process flow 500 for determining whether a plurality of access attempts are a part of a password spraying attack and the potential outcomes of such a determination, in accordance with an embodiment of the invention. In some embodiments, a system (e.g., similar to one or more of the systems described herein with respect to FIGS. 1A-1C and FIG. 2) may perform one or more of the steps of process flow 500. For example, a brute force identification system (e.g., the system 130 described herein with respect to FIGS. 1A-1C and the machine learning model/AI engine of FIG. 2) may perform the steps of process flow 500.

As shown in block 501, the process flow 500 may include the step of employing a streaming server which may transmit user interface components from a client and/or service provider to one or more client devices, where each user interface component may ask for input from the one or more client devices. In some embodiments, the user interface user component may request input from the one or more client devices as authentication credentials to log into one or more accounts. In some embodiments, and once the authentication credentials have been input into the user interface component, a traffic watcher (e.g., such as that shown at operation 502) may watch and/or track the authentication credentials entered—and other such behavior data that is described herein—into each of the user interface components.

As shown in block 502, the process flow 500 may include the step of employing a traffic watcher to watch and/or collect the input into each of the user interface components and the transmission of such data back to the client and/or service provider for processing of whether to allow access to the account. By way of non-limiting example, the traffic watcher may watch and/or collect data for a specific application and/or service and its associated user interface components/user input into the user interface components.

In some embodiments, the brute force identification system may comprise the traffic watcher such that it is part of the brute force identification system. For instance, the traffic watcher may watch and/or collect the data regarding each application and/or service and its associated inputs on the user interface components and may transmit this data within the brute force identification system for analyzation by the machine learning model/AI engine.

In some embodiments, the traffic watcher may be separate from the brute force identification system. For instance, the traffic watcher as a separate device configured by separate computer-program code may transmit the data watched and/or collected from the user interface components and the associated inputs to the brute force identification system for analyzation over a network (e.g., network 110 of FIG. 1A).

As shown in block 503, the process flow 500 may include the step of detecting the failure of the access attempts for a plurality of accounts. By way of non-limiting example, the brute force identification system may detect a plurality of failed access attempts at block 503 by using the data provided by the traffic watcher 502 and detecting which access attempts did not contain the correct authentication credentials, which may be referred to as a failed access attempt. Once the brute force identification system has detected the plurality of failed access attempts, the brute force identification system may then fetch the failure data of each of the failed access attempts, which may include at least one of the username entered, the password entered, the hash value generated from the entered password, and/or the behavior data.

As shown in block 504, the process 500 may include the step of fetching the failure data from each of the failed access attempts, such failure data may comprise the access attempt data (e.g., the authentication credentials—the username and password entered, the hash value generated based on the password of the authentication credentials, and/or the behavior data collected from the access attempts).

As shown in block 505, the process 500 may include the step of segmenting the hash values to generate the hash clusters and the associated access attempt data. By way of non-limiting example, the hash values may be segmented into hash clusters such that each hash cluster is associated with only one hash value and a plurality of access attempts which generated the same hash value (i.e., have the same password input as an authentication credential).

As shown in block 506, the process 500 may include the step of generating a behavior cluster for each hash cluster. In some embodiments, the behavior cluster for each hash cluster may comprise a plurality of behavior clusters such that each behavior cluster within the plurality of behavior clusters comprise a pattern for a type of behavior data.

As shown in block 507, the process 500 may include the step of determining a behavior similarity score. Such a behavior similarity score may be determined by the brute force identification system by the machine learning model/AI engine, by a client of the brute force identification system, and/or the manager of the brute force identification system. As described more fully herein, the machine learning model/AI engine may compare the behavior data received for the plurality of access attempts (e.g., current access attempts and/or future access attempts) in order to generate the behavior similarity score(s).

As shown in block 508, the process 500 may include the step of comparing the behavior similarity score to the behavior threshold.

In some embodiments, in response to the comparison of the behavior similarity score and as shown in block 510, the process 500 may include the step of determining that the behavior similarity score meets the behavior threshold.

In some embodiments, and once the brute force identification system has determined that the behavior similarity score meets the behavior threshold and as shown in block 511, the process 500 may include the step of flagging the plurality of access attempt(s) as likely misappropriation (i.e., as password spraying attack(s)). Based on the satisfaction of the behavior similarity score to meet the behavior threshold—which may be predetermined by the brute force identification system, a client of the system such as a client which controls the application and/or service that the traffic watcher is implemented to watch, and/or a manager of the brute force identification system—the brute force identification system may determine that the plurality of access attempts was actually a password spraying attack and may flag these access attempts as such. Such a flag may comprise a flag identifier within the brute force identification system that is associated with the access attempt and its data. The flag identifier may refer to a unique computer-readable sequence of elements to identify a specific access attempt and/or a specific hash value and its determination as being part of a misappropriation.

In some embodiments, and once the access attempt data has been flagged as a spraying attack (i.e., password spraying attack) and as shown in block 512, the access attempt may be automatically denied for a denial period. In some embodiments, the denial period may comprise a period of time that is predetermined by the brute force identification system, a client of the brute force identification system, and/or a manager of the brute force identification system.

In some embodiments, and once the access attempt data (e.g., including all of the access attempt data's authentication credentials, hash value, and/or behavior data) has been flagged and as shown in block 513, the access attempt data may be stored in a database, such as a behavior database, a hash value database, and/or a general database to store each of the access attempts, hash values and behavior data.

In some embodiments and based on the comparison of the behavior similarity score to the behavior threshold and as shown in block 514, the brute force identification system may determine that the behavior similarity score fails to meet the behavior threshold. In some embodiments and based on the determination that the behavior similarity score fails to meet the behavior threshold and as shown in block 515, the brute force identification system may allow access to the account associated with the access attempt, automatically. In some embodiments, the brute force identification system may allow access to the account where the passcode input for the authentication credentials is correct for the account and the behavior similarity score fails to meet the behavior threshold. By way of non-limiting example, this allowance of access to the account may be automatic once it has been determined that the behavior similarity score failed to meet the behavior threshold.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for identifying and preventing password spraying using hash signature segmentation and behavior clustering analysis, the system comprising:
    a memory device with computer-readable program code stored thereon;
    at least one processing device operatively coupled to the at least one memory device and at least one communication device, wherein executing the computer-readable code is configured to cause the at least one processing device to:
    receive a plurality of access attempts and an associated plurality of hash values;
    determine a failure request load based on the plurality of access attempts;
    determine whether the failure request load meets a failure threshold,
        wherein, in an instance where the failure request load meets the failure threshold, separating the plurality of access attempts associated with the failure request load into a plurality of hash clusters, each hash cluster of the plurality of hash clusters being based on a shared hash value of the plurality of access attempts;
    generate a behavior cluster for each hash cluster based on shared behavior data of the plurality of access attempts;
    determine, based on the behavior cluster for each hash cluster, a likelihood of misappropriation for each access attempt of the plurality of access attempts;
    receive future access attempt data associated with a future access attempt, the future access attempt data comprising future behavior data and a future hash value; and
    determine a behavior similarity score based on a comparison of the future behavior data,
        wherein, in an instance where the behavior similarity score meets a behavior similarity threshold, access is automatically denied to an account associated with the access attempt, or
        wherein, in an instance where the behavior similarity score fails to meet the behavior similarity threshold, store the future access attempt as a non-misappropriation.

2. The system of claim 1, wherein, in an instance where the plurality of access attempts are separated into the plurality of hash clusters, separating the plurality of hash clusters by a specified time period, such that each hash cluster of the plurality of hash clusters comprise the plurality of access attempts associated with the specified time period.

3. The system of claim 1, wherein executing the computer-readable code is further configured to cause the at least one processing device to:
    store the behavior cluster in a behavior database, wherein the behavior database comprises a plurality of behavior clusters associated with the plurality of access attempts without the associated plurality of hash values.

4. The system of claim 3, wherein the plurality of behavior clusters are used to determine the likelihood of misappropriation for each access attempt of the plurality of access attempts.

5. The system of claim 1, wherein executing the computer-readable code is configured to cause the at least one processing device to:
    store the associated plurality of hash values in a hash value database, wherein the hash value database comprises the associated plurality of hash values and an associated indication of a likelihood of misappropriation.

6. The system of claim 5, wherein the associated plurality of hash values stored in the hash value database are compared to a plurality of future hash values associated with a plurality of future access attempts and wherein, in an instance where a hash value of the hash value database matches a future hash value of the plurality of future access attempts, access is automatically denied to an account associated with the access attempt.

7. The system of claim 1, wherein a behavior cluster comprises a plurality of behavior clusters for the hash cluster.

8. The system of claim 7, wherein the plurality of behavior clusters comprises at least one of duplication data, interaction speed data, typing pattern data, error rate data, access attempt vicinity data, mouse dynamic data, event sequence data, authentication credential data, browser data, operating system data, device data, payload data, access attempt timestamp duplication data, access attempt timestamp pattern data, or source IP data.

9. A computer-program product for identifying and preventing password spraying using hash signature segmentation and behavior clustering analysis, wherein the computer program product comprises at least one non-transitory computer-readable medium having computer-readable program code portions embodied therein, the computer-readable program code portions which when executed by a processing device are configured to cause the processor to:
    receive a plurality of access attempts and an associated plurality of hash values;
    determine a failure request load based on the plurality of access attempts;
    determine whether the failure request load meets a failure threshold,
        wherein, in an instance where the failure request load meets the failure threshold, separating the plurality of access attempts into a plurality of hash clusters, each hash cluster of the plurality of hash clusters being based on a shared hash value of the plurality of access attempts;
    generate a behavior cluster for each hash cluster based on shared behavior data of the plurality of access attempts; and
    determine, based on the behavior cluster for each hash cluster, a likelihood of misappropriation for each access attempt of the plurality of access attempts;
    receive future access attempt data associated with a future access attempt, the future access attempt data comprising future behavior data and a future hash value; and
    determine a behavior similarity score based on a comparison of the future behavior data,
        wherein, in an instance where the behavior similarity score meets a behavior similarity threshold, access is automatically denied to an account associated with the access attempt, or
        wherein, in an instance where the behavior similarity score fails to meet the behavior similarity threshold, store the future access attempt as a non-misappropriation.

10. The computer program product of claim 9, wherein, in an instance where the plurality of access attempts are separated into the plurality of hash clusters, separating the plurality of hash clusters by a specified time period, such that the plurality of hash clusters comprise the plurality of access attempts associated with the specified time period.

11. The computer program product of claim 9, wherein the computer-readable program code portions which when executed by a processing device are further configured to cause the processor to:
    store the behavior cluster in a behavior database, wherein the behavior database comprises a plurality of behavior clusters associated with the plurality of access attempts without the associated plurality of hash values.

12. The computer program product of claim 11, wherein the plurality of behavior clusters are used to determine the likelihood of misappropriation for each access attempt of the plurality of access attempts separate from the associated plurality of hash values.

13. The computer program product of claim 9, wherein the computer-readable program code portions which when executed by a processing device are further configured to cause the processor to:
    store the associated plurality of hash values in a hash value database, wherein the hash value database comprises the associated plurality of hash values and an associated indication of a likelihood of misappropriation.

14. The computer program product of claim 13, wherein the associated plurality of hash values stored in the hash value database are compared to a plurality of future hash values associated with a plurality of future access attempts and wherein, in an instance where a hash value of the hash value database matches a future hash value of the plurality of future hash values, access is automatically denied to an account associated with the access attempt.

15. The computer program product of claim 9, wherein a behavior cluster comprises a plurality of behavior clusters for the hash cluster.

16. The computer program product of claim 15, wherein the plurality of behavior clusters comprises at least one of duplication data, interaction speed data, typing pattern data, error rate data, access attempt vicinity data, mouse dynamic data, event sequence data, authentication credential data, browser data, operating system data, device data, payload data, access attempt timestamp duplication data, access attempt timestamp pattern data, or source IP data.

17. A computer-implemented method for identifying and preventing password spraying using hash signature segmentation and behavior clustering analysis, the computer-implemented method comprising:
    receiving a plurality of access attempts and an associated plurality of hash values;

determining a failure request load based on the plurality of access attempts;

determining whether the failure request load meets a failure threshold,
  wherein, in an instance where the failure request load meets the failure threshold, separating the plurality of access attempts into a plurality of hash clusters, each hash cluster of the plurality of hash clusters being based on a shared hash value of the plurality of access attempts;

generating a behavior cluster for each hash cluster based on shared behavior data of the plurality of access attempts;

determining, based on the behavior cluster for each hash cluster, a likelihood of misappropriation for each access attempt of the plurality of access attempts;

receiving future access attempt data associated with a future access attempt, the future access attempt data comprising future behavior data and a future hash value; and determining a behavior similarity score based on a comparison of the future behavior data,
  wherein, in an instance where the behavior similarity score meets a behavior similarity threshold, access is automatically denied to an account associated with the access attempt, or
  wherein, in an instance where the behavior similarity score fails to meet the behavior similarity threshold, store the future access attempt as a non-misappropriation.

* * * * *